US012050421B2

(12) United States Patent
Yoshioka

(10) Patent No.: US 12,050,421 B2
(45) Date of Patent: Jul. 30, 2024

(54) IMAGE FORMING SYSTEM HAVING A FIRST MODE FOR FIXING AN IMAGE AND A SECOND MODE FOR NOT FIXING THE IMAGE TO AN OBJECT

(71) Applicant: FUJIFILM Business Innovation Corp., Tokyo (JP)

(72) Inventor: Tomoaki Yoshioka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/989,698

(22) Filed: Nov. 18, 2022

(65) Prior Publication Data

US 2023/0418195 A1 Dec. 28, 2023

(30) Foreign Application Priority Data

Jun. 28, 2022 (JP) ................................ 2022-103399

(51) Int. Cl.

| | |
|---|---|
| ***B41J 3/00*** | (2006.01) |
| ***B41J 3/407*** | (2006.01) |
| ***B41M 1/00*** | (2006.01) |
| ***B41M 1/26*** | (2006.01) |
| ***B41M 5/00*** | (2006.01) |
| ***G03G 15/00*** | (2006.01) |
| ***G03G 15/20*** | (2006.01) |

(52) U.S. Cl.

CPC ............ *G03G 15/205* (2013.01); *B41J 3/407* (2013.01); *B41M 1/26* (2013.01); *B41M 5/0041* (2013.01);

(Continued)

(58) Field of Classification Search

CPC ....... G03G 15/205; G03G 2215/00531; G03G 2215/00552; G03G 15/1615; G03G 15/5029; G03G 15/6591; G03G 2215/00527; G06F 3/121; G06F 3/1256; G06F 3/1219; G06K 15/4065; G06K 15/408; B41J 2/0057; B41J 2002/012; B41J 11/006; B41J 13/0036; B41J 29/38; B41J 3/407; B41J 3/4073; B41J 3/413; B41J 11/0021; B41J 11/00212; B41J 11/00216;

(Continued)

(56) References Cited

U.S. PATENT DOCUMENTS 5,359,400 A 10/1994 Itoh et al.
6,146,805 A 11/2000 Yoshimura et al.

(Continued)

FOREIGN PATENT DOCUMENTS

EP 0901051 3/1999
EP 3187941 7/2017

(Continued)

OTHER PUBLICATIONS

"Search Report of Europe Counterpart Application", issued on Oct. 26, 2023, p. 1-p. 8.

*Primary Examiner* — Robert B Beatty
(74) *Attorney, Agent, or Firm* — JCIPRNET

(57) ABSTRACT

An image forming system includes: a transporter that transports an object; a transfer unit that transfers an image onto the object transported by the transporter; a fixing unit that fixes, onto the object, the image transferred by the transfer unit; and a processor configured to: in a first mode, exert control to obtain the state in which the fixing unit enables an image to be fixed; and, in a second mode, exert control to obtain the state in which the fixing unit does not fix an image.

8 Claims, 10 Drawing Sheets

(52) U.S. Cl.
CPC ...... *G03G 15/6591* (2013.01); *B41P 2217/56* (2013.01)

(58) Field of Classification Search
CPC ............... B41J 11/00218; B41J 3/4078; B41F 23/0459; B41F 23/045; B41P 2217/56; B41M 1/26; B41M 1/28; B41M 1/34; B41M 5/0041; B41M 5/0058; B41M 5/007; B41M 7/009
USPC ...................................................... 399/20, 67
See application file for complete search history.

(56) References Cited

U.S. PATENT DOCUMENTS 6,205,297 B1* 3/2001 Tachibana .............. G03G 15/55 399/21
2002/0021911 A1* 2/2002 Matsuura ............... B41J 3/4076 399/45
2015/0234332 A1* 8/2015 Gotoda .............. G03G 15/2028 399/122
2017/0312984 A1 11/2017 Ruiz et al.
2022/0050411 A1* 2/2022 Sugaya .............. G03G 15/2039
2023/0418185 A1* 12/2023 Yoshioka ............... G03G 15/14
2023/0418190 A1* 12/2023 Yoshioka ........... G03G 15/6591

FOREIGN PATENT DOCUMENTS

EP 3964365 3/2022
JP 59-091471 A * 5/1984
JP S63163882 7/1988
JP H0329295 4/1991
JP 3292954 6/2002
JP 2018066791 4/2018
JP 6900650 7/2021
KR 2003-0026639 A * 4/2003

* cited by examiner

IMAGE FORMING SYSTEM HAVING A FIRST MODE FOR FIXING AN IMAGE AND A SECOND MODE FOR NOT FIXING THE IMAGE TO AN OBJECT

CROSS-REFERENCE TO RELATED APPLICATIONS

This application is based on and claims priority under 35 USC 119 from Japanese Patent Application No. 2022-103399 filed Jun. 28, 2022.

BACKGROUND

(i) Technical Field

The present disclosure relates to an image forming system.

(ii) Related Art

In recent years, images may be printed, for example, on metal, glass, and tile (hereinafter referred to as “objects”). These objects have various thicknesses and shapes. Therefore, the image quality of the objects needs to be checked, and the settings of the objects need to be adjusted.

A technique of the related art is disclosed in Japanese Patent No. 3292954.

In an existing image forming system, a transferred image is fixed onto an object even in image quality adjustment. However, the per-unit price of metal, glass, tile, or the like is more expensive than that of paper. Therefore, disposal of objects used in image quality adjustment causes a large burden in view of cost.

SUMMARY

Aspects of non-limiting embodiments of the present disclosure relate to a technique for achieving reduction of wasteful objects compared with the case in which an image transferred for image quality adjustment is fixed onto an object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system comprising: a transporter that transports an object; a transfer unit that transfers an image onto the object transported by the transporter; a fixing unit that fixes, onto the object, the image transferred by the transfer unit; and a processor configured to: in a first mode, exert control to obtain a state in which the fixing unit enables an image to be fixed; and in a second mode, exert control to obtain a state in which the fixing unit does not fix an image.

BRIEF DESCRIPTION OF THE DRAWINGS

Exemplary embodiments of the present disclosure will be described in detail based on the following figures, wherein.

DETAILED DESCRIPTION

Figure 1:
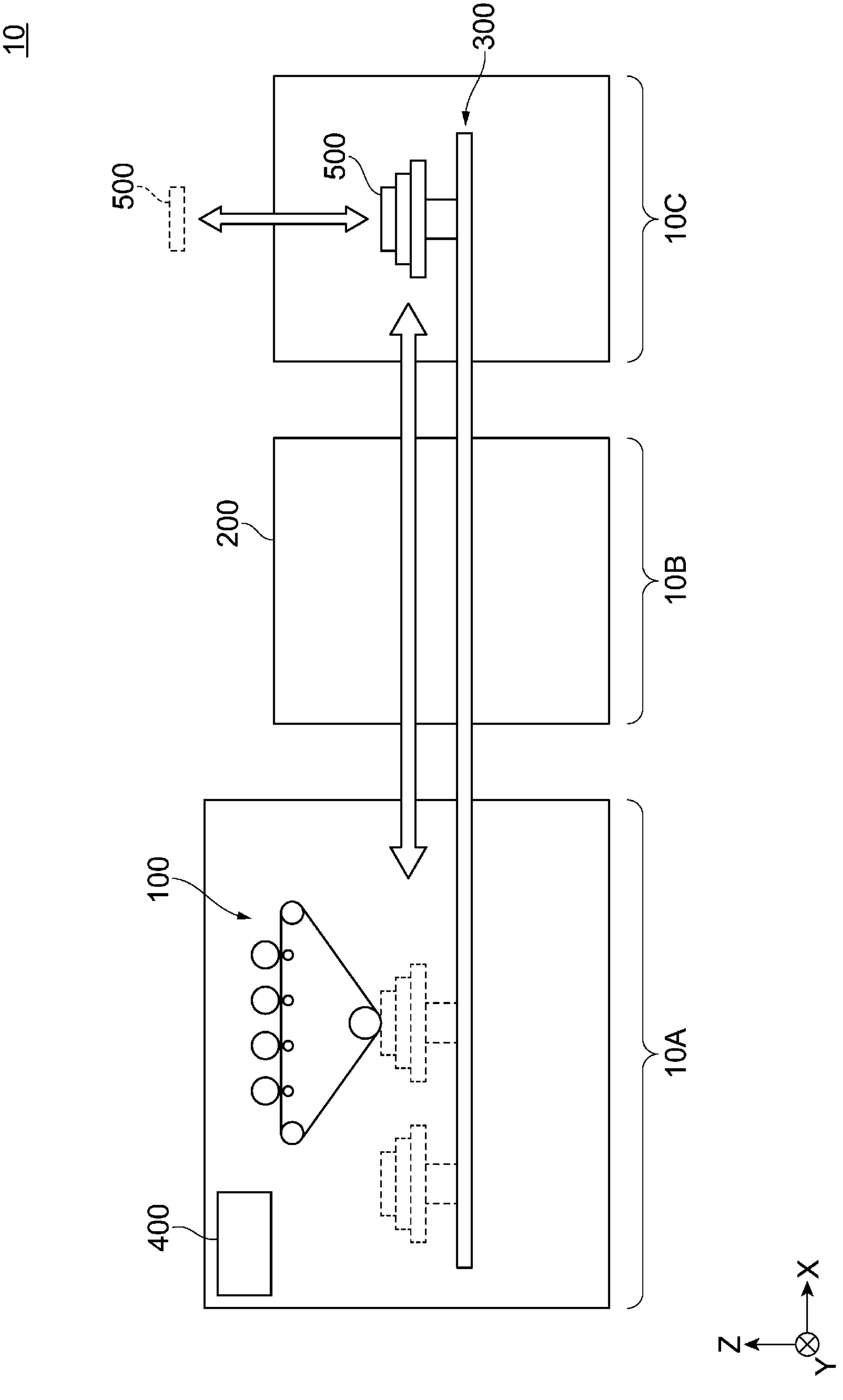
FIG. 1 is a diagram for describing a schematic configuration of an image forming apparatus which is assumed in a first exemplary embodiment.

Referring to the drawings, exemplary embodiments of the present disclosure will be described below.

First Exemplary Embodiment

Image Forming Apparatus

FIG. 1 is a diagram for describing a schematic configuration of an image forming apparatus 10 which is assumed in a first exemplary embodiment. The image forming apparatus 10 is an exemplary image forming system.

In the first exemplary embodiment, an object to be printed on is referred to as a medium 500. The material of a medium 500 is, for example, metal, glass, tile, ceramic, or wood, and has a standardized size. That is, the image forming apparatus 10 in the first exemplary embodiment forms images, one by one, on the surfaces of media 500 having the same material and shape. FIG. 1 illustrates the case of a flat-shaped medium 500.

In the first exemplary embodiment, a length in the Z-axis direction in the figures is referred to as a “height” or “thickness”; transporting a medium 500 in the Z-axis direction is referred to as “raising/lowering”.

A plane defined by the X axis and the Y axis in the figures is horizontal to the floor. In the first exemplary embodiment, transporting a medium 500 in the X-axis direction is referred to as “transporting in the horizontal direction”.

The image forming apparatus 10 illustrated in FIG. 1 includes three housings 10A, and 10C. The image forming apparatus 10 may appear as if it has a single housing.

The housing 10A contains a transfer unit 100 and a processing unit 400. The housing 10B contains a fixing unit 200. The housing 10C is provided to take in and out a medium 500. To do this, an opening (not illustrated) is disposed on the top surface of the housing 10C.

The image forming apparatus 10 includes a transporter 300 which extends across the three housings 10A, 10B, and 10C. The transporter 300 is an exemplary transporter.

The transfer unit 100 transfers, onto a medium 500, an image formed by using toner or powder particles. That is, the transfer unit 100 in the first exemplary embodiment forms an image by using an electrophotographic system.

The fixing unit 200 heats toner or the like, which has been transferred by the transfer unit 100, to fix the toner or the like onto the surface of the medium 500. The first exemplary embodiment employs a contactless heating system. In the first exemplary embodiment, a heat source is used to heat the surface of a medium 500 and the toner or the like at the same time.

The Configuration of the Transfer Unit 100

Figure 2:
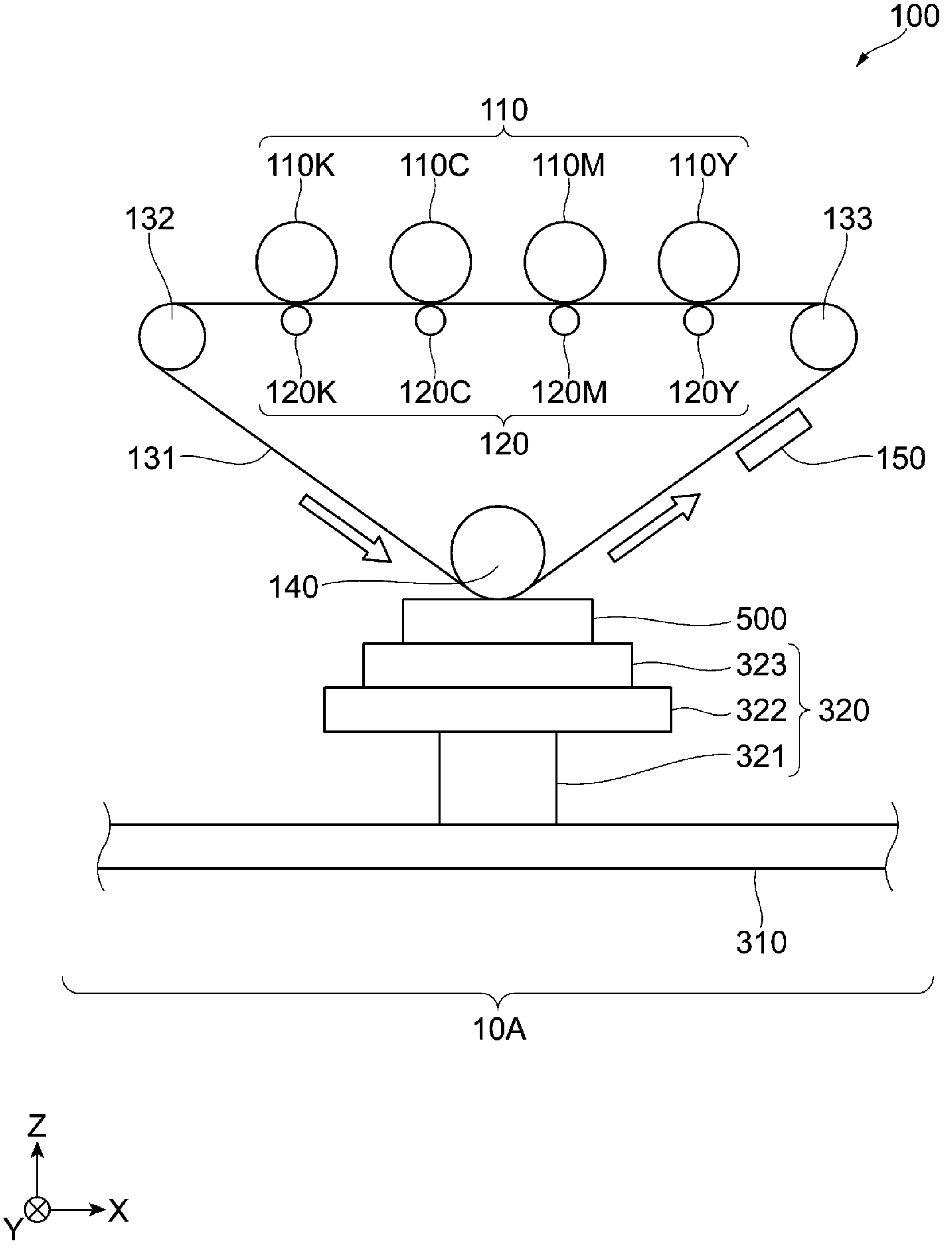
FIG. 2 is a diagram illustrating an exemplary configuration of a transfer unit.

FIG. 2 is a diagram illustrating an exemplary configuration of the transfer unit 100. The transfer unit 100 forms an image with charged particles, and generates an electric field to transfer the image onto a medium 500.

The transfer unit 100 includes developing devices 110, first-transfer rolls 120, and an intermediate transfer belt 131. The intermediate transfer belt 131, which is stretched around driving rolls 132 and 133 and a backup roll 140, travels cyclically.

Additionally, the transfer unit 100 has a cleaning device 150 which removes particles having been attached to the intermediate transfer belt 131.

Each developing device 110 is a unit which forms an electrostatic latent image of an image on its photoreceptor, and which attaches charged particles to the electrostatic latent image on the photoreceptor to develop the image. The developing devices 110 illustrated in FIG. 2 support four colors, which are black as well as three colors of yellow, magenta, and cyan.

In FIG. 2, units corresponding to the colors of yellow, magenta, cyan, and black are labeled with Y, M, C, and K indicating the respective colors. When the colors are not necessary to be discriminated, the units are not labeled with Y, M, C, and K.

The first-transfer rolls 120 are used to transfer, onto the intermediate transfer belt 131, images formed on the developing devices 110. The transfer using the first-transfer rolls 120 is called "first transfer".

The first-transfer rolls 120 are disposed so as to be opposite the respective developing devices 110 with the intermediate transfer belt 131 interposed in between. The first-transfer rolls 120 bring the outer surface of the intermediate transfer belt 131 in contact with the developing devices 110.

The first-transfer rolls 120 are provided for the respective developing devices 110Y, 110M, 110C, and 110K. FIG. 2 illustrates the first-transfer rolls 120, which correspond to the respective colors, with the labels of 120Y, 120M, 120C, and 120K.

In FIG. 2, the intermediate transfer belt 131 travels in the direction indicated by the arrow (that is, the counterclockwise direction). For example, either one or both of the driving rolls 132 and 133 cause the intermediate transfer belt 131 to travel.

In FIG. 2, images formed by the developing devices 110 are transferred onto the outer surface of the intermediate transfer belt 131. That is, the intermediate transfer belt 131 holds formed images. Hereinafter, the outer surface of the intermediate transfer belt 131 is referred to as a "transfer surface".

In the configuration illustrated in FIG. 2, the intermediate transfer belt 131 passes the developing devices 110Y, 110M, 110C, and 110K sequentially so that a multicolor image, in which yellow, magenta, cyan, and black are stacked on the transfer surface from the bottom layer in this sequence, is formed.

The backup roll 140 is a roller which brings the transfer surface of the intermediate transfer belt 131 in contact with a medium 500 to transfer the image onto the surface of the medium 500. The transfer using the backup roll 140 is called "second transfer".

In second transfer, a predetermined voltage is applied to the backup roll 140. Application of the voltage causes an electric field (hereinafter referred to as a "transfer electric field") to occur between the backup roll 140 and a medium 500 so that the image formed with charged particles is transferred from the intermediate transfer belt 131 to the medium 500.

Thus, transfer of an image from the intermediate transfer belt 131 to a medium 500 needs a current which flows from the backup roll 140 through the intermediate transfer belt 131 to the medium 500.

When a medium 500 is a conductor such as metal, since a current flows through the medium 500 itself, an image is transferred onto the surface of the medium 500 through occurrence of a transfer electric field.

In contrast, when a medium 500 is a nonconductor, an image is not transferred onto the surface of the medium 500 unless additional configuration is provided. Therefore, when a medium 500 is a nonconductor, a layer (hereinafter referred to as a "conductive layer") of a conductive member is formed in advance at least in a portion, in which an image is to be formed, to provide a path through which a current flows. Thus, an image may be also transferred onto a nonconductor.

The procedure of image transfer using the intermediate transfer belt 131 will be described simply.

Images of the colors are sequentially transferred onto the transfer surface of the intermediate transfer belt 131 passing the developing devices 110Y, 110M, 110C, and 110K. As a result, a multicolor image is held on the transfer surface of the intermediate transfer belt 131.

When the intermediate transfer belt 131 further rotates, the multicolor image held on the transfer surface of the intermediate transfer belt 131 reaches the position (hereinafter referred to as the "transfer position") where the multicolor image is in contact with a medium 500.

In this state, when the voltage is applied to the backup roll 140 and a transfer electric field occurs, the image is transferred from the intermediate transfer belt 131 to the medium 500.

The cleaning device 150 is a unit which removes particles remaining on the transfer surface of the intermediate transfer belt 131 which has passed the transfer position.

The cleaning device 150 is disposed between the transfer position and the developing device 110Y in the rotation direction of the intermediate transfer belt 131. In other words, the cleaning device 150 is disposed downstream of the transfer position and upstream of the developing device 110Y.

Removal of particles by the cleaning device 150 provides preparation for the next cycle. That is, transfer of a new image onto the transfer surface is ready.

The Configuration of the Transporter 300

An exemplary configuration of the transporter 300 which transports a medium 500 will be described.

As described above, the image forming apparatus 10 in the first exemplary embodiment is used to form images on media 500 having various thicknesses. Therefore, the height of the mounting surface on the transporter 300 side needs to be adjusted.

Thus, the transporter 300 in the first exemplary embodiment has a mechanism for raising/lowering a medium 500 in the vertical direction in addition to a mechanism for transporting a medium 500 in the horizontal direction.

In FIG. 2, the transporter 300 (see FIG. 1) includes a transport rail 310 which defines a transport path for a medium 500, and a mount 320 which moves along the transport rail 310.

The mount 320 has a leg 321 which moves along the transport rail 310, and a pedestal 322 on which a medium 500 is mounted. Among these, the leg 321 has a mechanism for raising/lowering the pedestal 322 in the vertical direction. In this sense, the leg 321 is an exemplary transporter and an exemplary raising/lowering unit. In a broad sense, the leg 321 and the pedestal 322 are referred to as a transporter.

On the pedestal 322, a medium 500 may be mounted directly, or a jig 323 may be mounted. The jig 323 is a member used to hold a medium 500, and is mounted on the mounting surface of the pedestal 322 for use. Therefore, the jig 323 may be freely attached to/detached from the mounting surface of the pedestal 322.

The transport rail 310 is installed through the three housings 10A to 10C.

The transport rail 310 has one end portion disposed in the housing 10C where a transport operation starts and where a transport operation ends. The transport rail 310 has the other end portion disposed in the housing 10A in which the transfer unit 100 is disposed.

The mount 320, on which a medium 500 is mounted, is transported from the housing 10C, in which one end portion is present, to the housing 10A, in which the other end portion is present. In the transport operation, an operation of adjusting the height of the top of the medium 500 to the elevation of the intermediate transfer belt 131 is also performed. The end portion of the transport rail 310 in the housing 10A is spaced apart from the transfer position by a predetermined distance. The distance refers to a minimum distance necessary to accelerate the mount 320, which is in the halt state, to a target speed. Actually, the speed of the mount 320 needs to be maintained at the target speed. Thus, not only the distance for acceleration but also the distance for checking if the mount 320 moves at the target speed is necessary. The target speed is the traveling speed of the intermediate transfer belt 131.

After the mount 320, which starts moving from the end portion in the housing passes the transfer unit 100, the mount 320 is transported to the fixing unit 200. The fixing unit 200 fixes the image which has been transferred onto the medium 500. After completion of the fixing, the mount 320 is transported to the housing 10C. The medium 500, on which the image has been formed, is taken out through the opening provided for the housing 10C.

The mechanism for implementing a move of the mount 320 along the transport rail 310 is not particularly limited to this configuration. For example, a configuration in which the leg 321 provided with a motor or another driving device moves by itself may be employed. Alternatively, a motor or another driving device which pulls the leg 321 may be provided for the transport rail 310.

In addition, the mechanism for raising/lowering the pedestal 322 is not limited to this configuration. For example, a configuration in which a rack and pinion and a motor are used to raise/lower the pedestal 322 may be provided for the leg 321. A gear or another mechanism which is interlocked with the elevation of the pedestal 322 may be provided for the leg 321, and the elevation of the pedestal 322 may be adjusted manually.

In height adjustment using a motor or another driving device, information about the height of the mounting surface which is specified by a user may be used, or information about the thickness of a medium 500 which is input by a user may be used. Alternatively, a sensor output may be used. The sensor output includes output of a relative height with respect to a reference height, and information such as a pressure and a distortion which are applied to the leg 321 when a medium 500 is pressed against the intermediate transfer belt 131.

The pedestal 322 may be provided, for example, with a groove, a protrusion, or a fastener which is used to position a medium 500 or the jig 323. These are exemplary structures or mechanisms for positioning. A combination of these may be provided for the pedestal 322.

For example, when the pedestal 322 is provided with a fastener, the jig 323 may be fixed to the mounting surface regardless of the shape of the jig 323. The fastener makes an integral unit constituted by the jig 323 and the pedestal 322, achieving reduction of transfer misalignment of an image.

In addition, the pedestal 322 is mounted so as to be able to rise and fall with respect to the leg 321 in accordance with a pressure from above. A mechanism for enabling the pedestal 322 to rise and fall is implemented, for example, by disposing a rubber, a spring, or another elastic body in a joint portion between the pedestal 322 and the leg 321. Employment of this kind of configuration causes an impact, which occurs when a medium 500 comes in contact with the intermediate transfer belt 131 of the transfer unit 100, to be softened.

The jig 323 is a tool attached to the pedestal 322 when necessary. The jig 323 has a shape, a structure, and a mechanism in accordance with the structure and the mechanism of the mounting surface of the pedestal 322. For example, a hole for inserting a screw into a tapped hole provided on the mounting surface, a hole for inserting a pin provided on the mounting surface, or a protrusion or a groove for positioning is formed on the bottom surface or a side surface of the jig 323.

A shape, a structure, or a mechanism, which is suitable to hold a medium 500 which is an object to be mounted, is provided on the top surface of the jig 323. A jig 323 may be prepared for each medium 500 which is an object to be mounted, or a jig 323 which may support multiple shapes and sizes may be prepared.

The Configuration of the Fixing Unit 200

The configuration of the fixing unit 200 will be described.

In the first exemplary embodiment, both a medium 500 before transfer of an image and a medium 500 after transfer of an image pass through the fixing unit 200.

The fixing unit 200 in the first exemplary embodiment is provided with, not only an operation mode (hereinafter referred to as the "fixing mode") in which a transferred image is fixed on a medium 500, but also an operation mode (hereinafter referred to as the "non-fixing mode") in which a transferred image is passed without being fixed.

Figure 3:
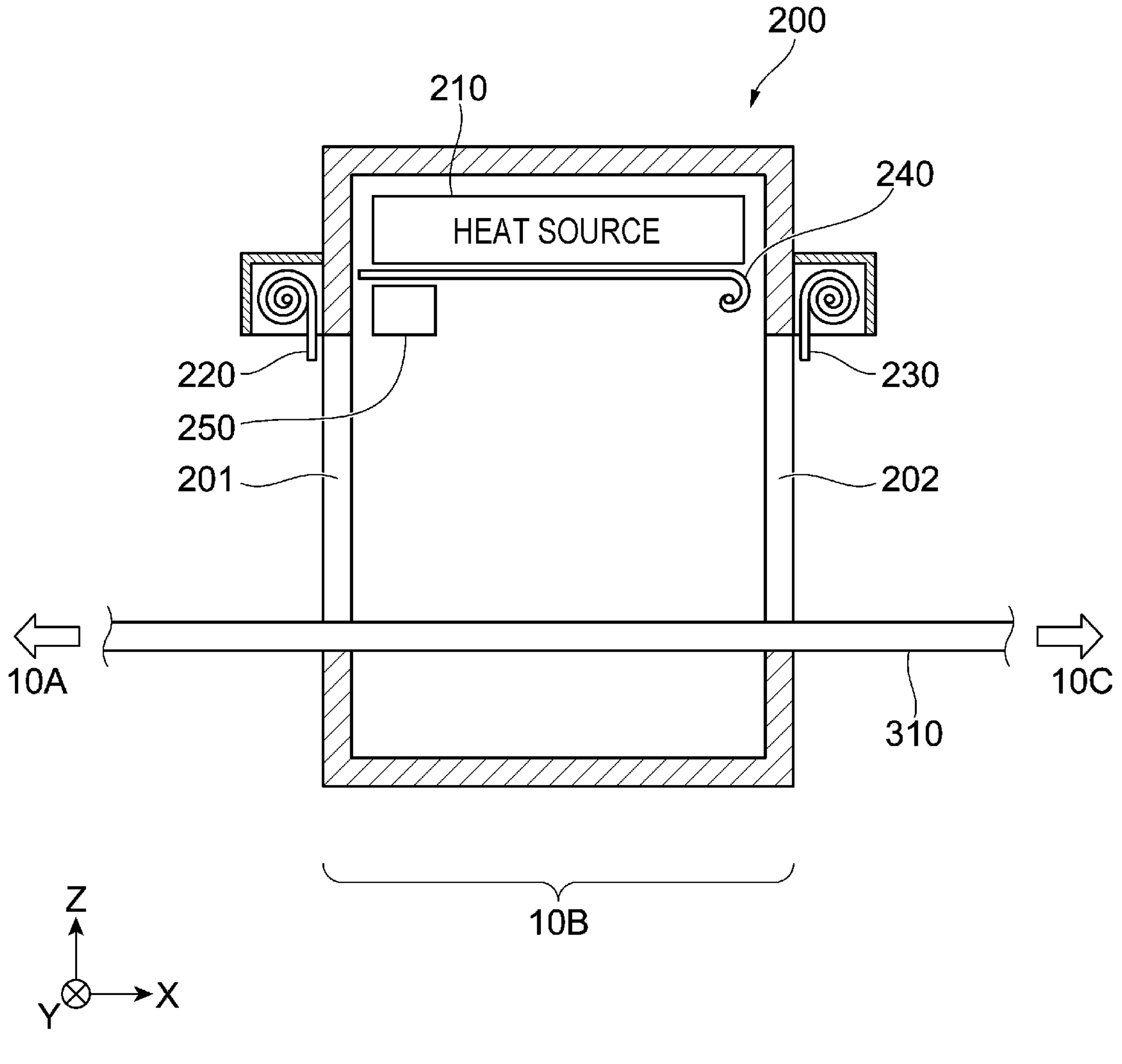
FIG. 3 is a diagram for describing an exemplary configuration of a fixing unit.

FIG. 3 is a diagram for describing an exemplary configuration of the fixing unit 200. FIG. 3 illustrates the case in which openings 201 and 202, which are doorways of the housing 10B, are open.

The opening 201 is opened when a medium 500 is taken in/out between the housing 10A and the housing 10B, and is closed when a transferred image is to be fixed onto a medium 500.

The opening 202 is opened when a medium 500 is taken in/out between the housing 10C and the housing 10B, and is closed when a transferred image is to be fixed onto a medium 500.

In FIG. 3, a roll-up shutter 220 serving as an opening/closing member is attached to the opening 201. A roll-up shutter 230 serving as an opening/closing member is attached to the opening 202. In FIG. 3, the openings 201 and 202 are open. Thus, both the roll-up shutters 220 and 230 are rolled up. When the openings 201 and 202 are closed, the end portions of the shutters 220 and 230 are pulled out to positions near the transport rail 310.

When a medium 500 is transported into the fixing unit 200 to fix an image, only the shutter 220 on the opening 201 side is opened, and the shutter 230 of the opening 202 on the opposite side remains closed. Thus, a decrease of the temperature in the fixing unit 200 is reduced. In contrast, when a medium 500 having a fixed image is to be taken out, only the shutter 230 on the opening 202 side is opened, and the shutter 220 of the opening 201 on the opposite side may remain closed or may be opened.

The fixing unit 200 (see FIG. 1) in the first exemplary embodiment employs a contactless heating system. Therefore, images may be fixed onto media 500 having various thicknesses and shapes.

In FIG. 3, a heat source 210 is attached to the ceiling of the fixing unit 200. The heat source 210 may be attached, not limited to the ceiling, to a wall or both the ceiling and a wall.

For example, a halogen lamp, a ceramic heater, or an infrared lamp is used as the heat source 210. In the first exemplary embodiment, particles melted through heating are fixed onto the surface of a medium 500.

In FIG. 3, a roll-up shutter 240 is attached between the heat source 210 and a space (hereinafter referred to as a "heating chamber") through which a medium 500 passes. FIG. 3 illustrates the state in which the roll-up shutter 240 is pulled out, that is, the state in which the heat source 210 is separated from the heating chamber. For the shutter 240, a material having the heat insulation property is used.

In FIG. 3, the heating chamber contains a temperature sensor 250. The ambient temperature measured by the temperature sensor 250 is output to the processing unit 400 (see FIG. 1).

When the ambient temperature in the heating chamber is greater than or equal to a temperature (hereinafter referred to as a "reference value") at which an image may be fixed, a transferred image is fixed onto a medium 500. In contrast, when the ambient temperature is less than the reference value, a transferred image fails to be fixed onto a medium 500. The reference value is influenced, for example, by the type of transferred particles or the thermal conductivity of a medium 500. In fixing an image, not only the ambient temperature but also the time in which a medium 500 stays in the heating chamber is to be considered.

The Configuration of the Processing Unit 400

In the first exemplary embodiment, the processing unit 400 (see FIG. 1) is disposed in the housing 10A (see FIG. 1) in which the transfer unit 100 (see FIG. 1) is disposed. The processing unit 400 may be disposed in the housing 10B in which the fixing unit 200 (see FIG. 1) is disposed, or the housing 10C having the opening through which a medium 500 is taken in/out. The processing unit 400 may be provided for the housings 10A, 10B, and 10C of the image forming apparatus 10 as an external unit, or may be disposed on a network communicatively.

Figure 4:
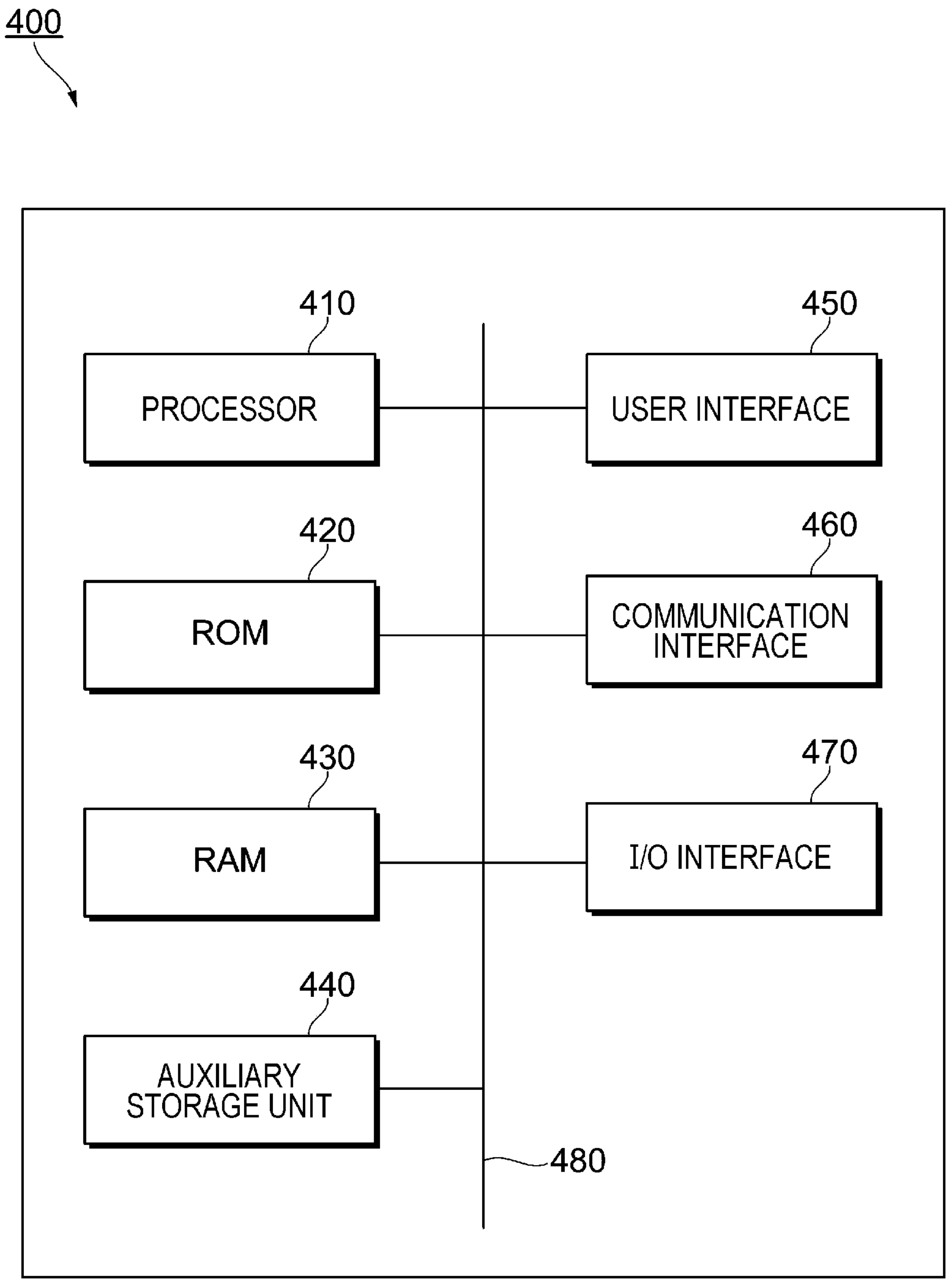
FIG. 4 is a diagram for describing an exemplary configuration of a processing unit.

FIG. 4 is a diagram for describing an exemplary configuration of the processing unit 400.

The processing unit 400 includes a processor 410, a read only memory (ROM) 420 which stores, for example, a basic input output system (BIOS), a random access memory (RAM) 430 which is used as a work area of the processor 410, an auxiliary storage unit 440, a user interface 450, a communication interface 460, and an input/output (I/O) interface 470. The processor 410 is connected to the other devices through a bus or another signal line 480.

The processor 410 is a device for implementing various functions through execution of programs. The processor 410, the ROM 420, and the RAM 430 function as a computer.

The auxiliary storage unit 440 is configured, for example, by a hard disk device or a semiconductor storage. The auxiliary storage unit 440 stores programs and various types of data. A program herein is used as a general term for an operating system (OS), firmware, and an application program.

In the first exemplary embodiment, the auxiliary storage unit 440 is contained in the housing 10A. Alternatively, the auxiliary storage unit 440 may be provided, as an external unit, for the housing 10A through the I/O interface 470, or may be a portable memory which may be attached to and detached from the housing 10A. The auxiliary storage unit 440 may be present on a network connected to the communication interface 460.

The user interface 450 includes, for example, a touch panel, operation buttons, and a speaker which are used in display of an image for operation and in reception of operations. The touch panel is configured by a liquid-crystal display, an organic light-emitting diode (OLED) display, or another display, and an electrostatic-capacity sensor which detects a change in electrostatic capacity.

The communication interface 460 is an interface for communicating with terminals on a network. The communication interface 460 supports various types of communication standards. The communication standards include, for example, Ethernet™, Wi-Fi™, and a mobile communication system.

The I/O interface 470 is an interface for communicating with the transfer unit 100 (see FIG. 1), the fixing unit 200 (see FIG. 1), and the transporter 300 (see FIG. 1).

Adjustment Operation

As described above, media 500 have various thicknesses and shapes. Therefore, before images are continuously formed on media 500 having the same thickness and shape, an adjustment operation is performed. Specifically, the height of the top of a medium 500 is adjusted to the height of the transfer position of the intermediate transfer belt 131.

Figure 5:
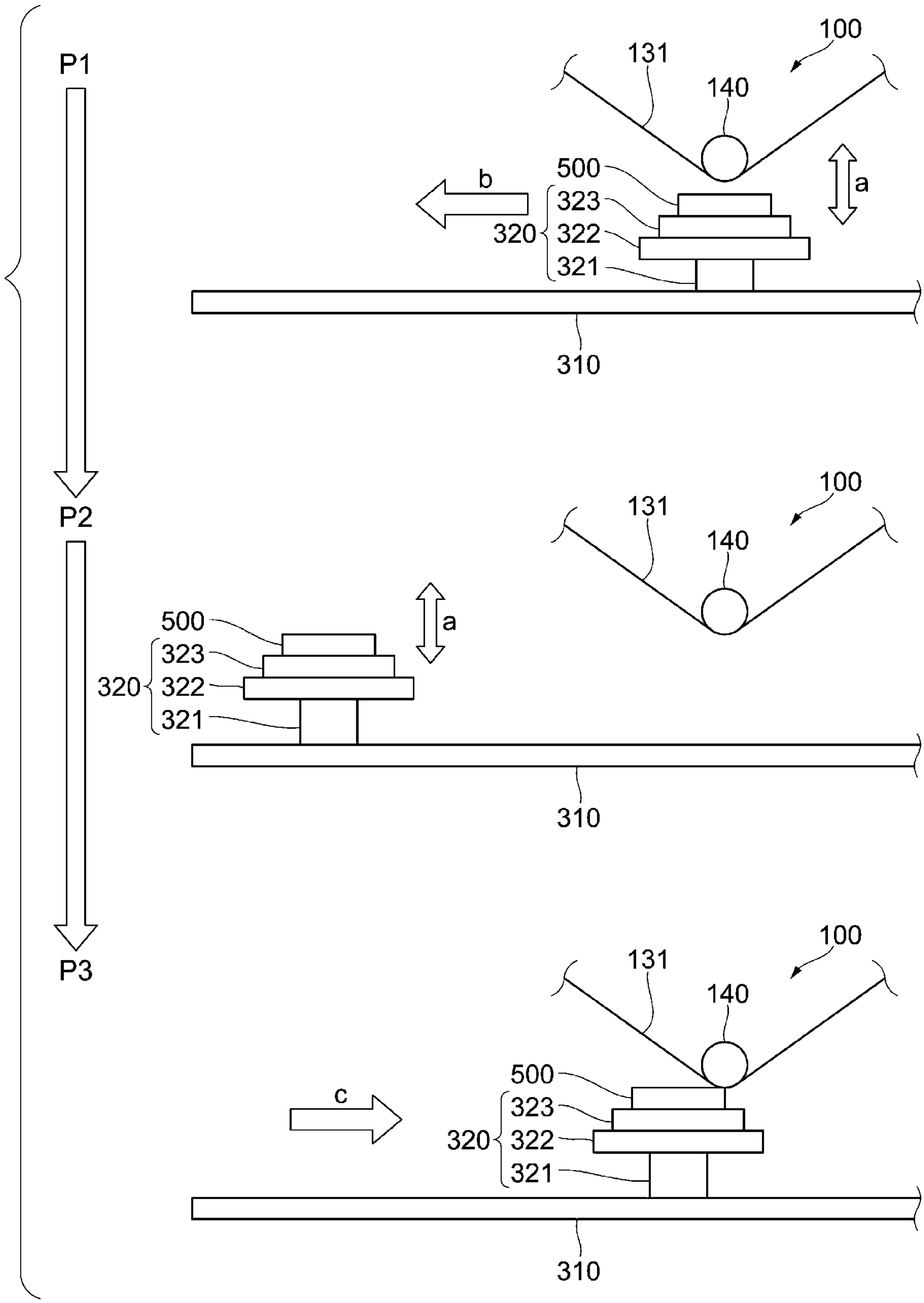
FIG. 5 is a diagram for describing an exemplary adjustment operation.

FIG. 5 is a diagram for describing an exemplary adjustment operation.

In a height calibration P1, a medium 500, which has been taken in through the opening of the housing 10C, is mounted on the mounting surface of the mount 320. In the example in FIG. 5, the jig 323 is attached to the top surface of the pedestal 322, and the medium 500 is attached to the top surface of the jig 323.

When the medium 500 is attached to the jig 323, the height calibration P1 starts. On start of the height calibration P1, the leg 321 is lowered from its initial position. The leg 321 is lowered in order that, when the mount 320 is horizontally moved to the intermediate transfer belt 131, the top of the medium 500 does not come in contact with the lower end of the intermediate transfer belt 131. The amount of lowering is predetermined. For example, the mount 320 is moved to the lowermost end of the movable range of the leg 321. Hereinafter, the height of the mount 320 after the lowering is referred to as the "transport height".

When the mount 320 is lowered to the transport height, transporting the mount 320 in the horizontal direction starts. The mount 320 passes through the fixing unit 200, and is transported to the position where the mount 320 faces the intermediate transfer belt 131.

When the mount 320 arrives at the target position, transporting the mount 320 in the horizontal direction is temporarily stopped.

At this position, the leg 321 is raised, and the height (hereinafter also referred to as the "transfer height") at which the top of the medium 500 is in contact with the lower end of the intermediate transfer belt 131 is detected. This detection operation is referred to as the height calibration P1.

The medium 500, which has been positioned at the transfer height, is pressed against the intermediate transfer belt 131 with a strength suitable for transfer.

The transfer height is stored as the height of the leg 321 in the RAM 430 (see FIG. 4) or the auxiliary storage unit 440 (see FIG. 4) of the processing unit 400.

On completion of the height calibration P1, the leg 321 is lowered again to the transport height so that the medium 500 is not in contact with the intermediate transfer belt 131. In FIG. 5, the raising/lowering operation is indicated by arrow a.

The mount 320, which has been lowered to the transport height, is transported to the preparation position for transfer. In FIG. 5, the transport operation is indicated by arrow b.

When the mount 320 arrives at the preparation position, transporting the mount 320 in the horizontal direction is temporarily stopped.

At this position, the leg 321 is raised, and the top of the medium 500 is positioned at the transfer height. The positioning operation is referred to as a transfer preparation operation P2. The positioning operation is indicated by arrow a.

When the mount 320 is positioned at the transfer height, a transfer operation P3 starts.

On start of the transfer operation P3, the mount 320 is transported in the horizontal direction in conjunction with image formation on the intermediate transfer belt 131. In FIG. 5, the transport operation is indicated by arrow c.

The images, which have been subjected to first transfer onto the intermediate transfer belt 131, are positioned at the lowermost point of the intermediate transfer belt 131 at the time point at which the medium 500 has been transported to the transfer position. Therefore, as the medium 500 is transported in the horizontal direction, all the images are transferred onto the medium 500.

Fixing Mode

Figure 6:
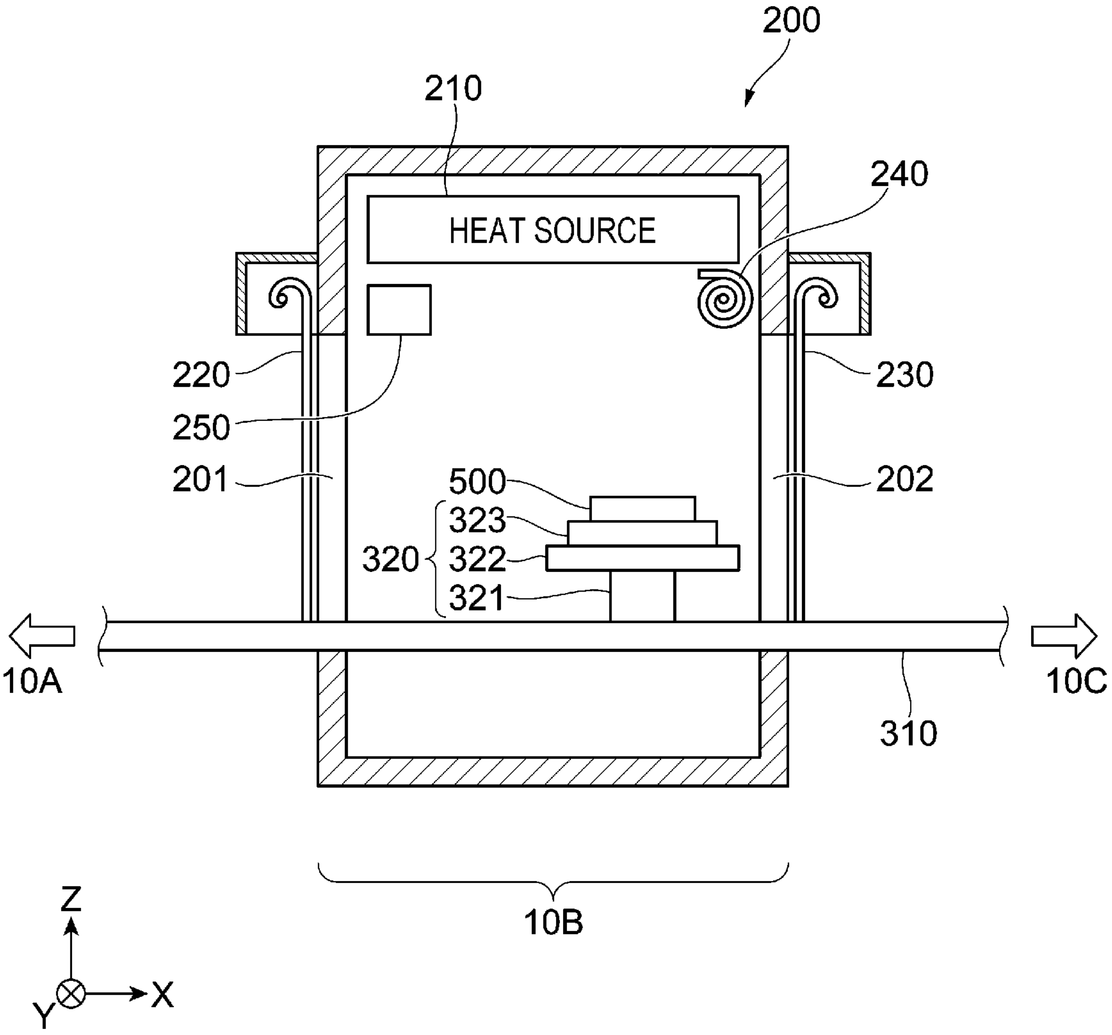
FIG. 6 is a diagram for describing an operation performed by a fixing unit when an image is to be fixed.

FIG. 6 is a diagram for describing an operation performed by the fixing unit 200 when an image is to be fixed. In FIG. 6, parts corresponding to those in FIG. 3 are designated with the corresponding reference numerals.

In the first exemplary embodiment, a medium 500 is stopped in the heating chamber. The medium 500 may continue to move at a low speed in the direction to the housing 10C.

The fixing unit 200 raises the ambient temperature in the heating chamber to a reference value or more through heating so that an image is fixed onto the surface of the medium 500. Therefore, the end portion of the shutter 220 and that of the shutter 230 are lowered to positions near the transport rail 310. As a result, the opening 201 and the opening 202 are closed. Thus, the ambient temperature in the heating chamber reaches the reference value or more which is suitable for fixing.

Non-Fixing Mode

Figure 7:
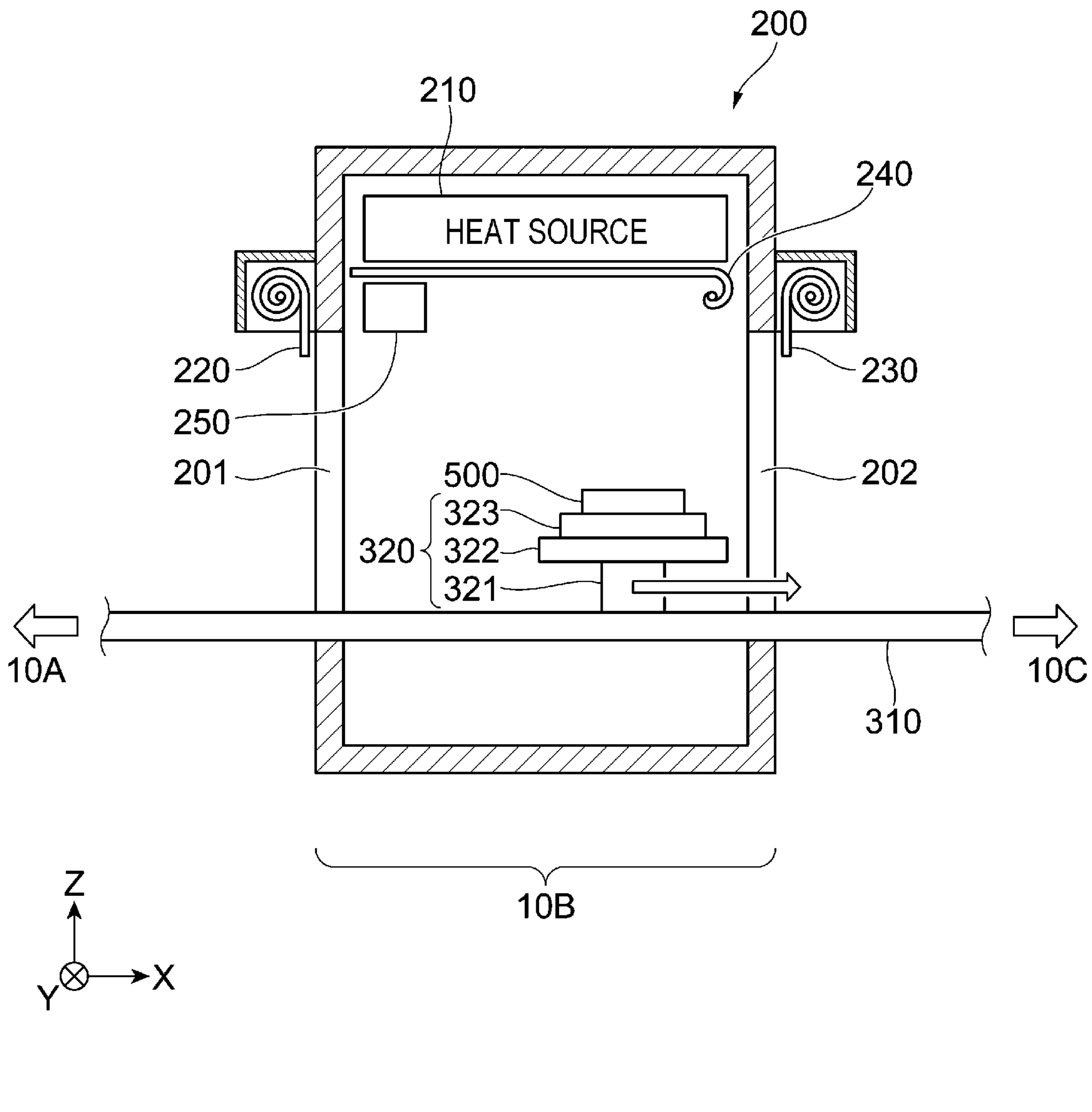
FIG. 7 is a diagram for describing an operation performed by a fixing unit when an image is not to be fixed.

FIG. 7 is a diagram for describing an operation performed by the fixing unit 200 when an image is not to be fixed. In FIG. 7, parts corresponding to those in FIG. 6 are designated with the corresponding reference numerals.

For example, when an image is to be formed on a new medium 500, the image quality may be checked by using so-called test printing. However, the per-unit price of a medium 500 assumed in the first exemplary embodiment is comparatively expensive. Thus, the following operation mode is prepared for the so-called test printing: an image is transferred onto a medium 500, but the transferred image is not fixed onto the medium 500. That is, the non-fixing mode is prepared.

Therefore, in the non-fixing mode illustrated in FIG. 7, the shutter 220 and the shutter 230 are rolled up, and both the opening 201 and the opening 202 are open. Since both the opening 201 and the opening 202 are open, outside air flows into the heating chamber, and, instead, the high-temperature air flows out. Thus, the ambient temperature is decreased. In FIG. 7, the shutter 240 is pulled out to separate the heat source 210 from the heating chamber. Thus, the ambient temperature in the heating chamber is easy to be lower than the reference value. In the case of test printing, control is exerted so that the openings 201 and 202 are open before an image is transferred onto a medium 500, so that the ambient temperature is lower than the reference value.

In this state, the transporter 300 causes the medium 500 to pass through the fixing unit 200 without stopping. Thus, transferred toner or the like is not fixed onto the surface of the medium 500. As a result, after the image quality of the medium 500 taken out from the housing 10C is checked, the transferred toner or the like is removed, enabling reuse of the medium 500.

Control Operation

Figure 8:
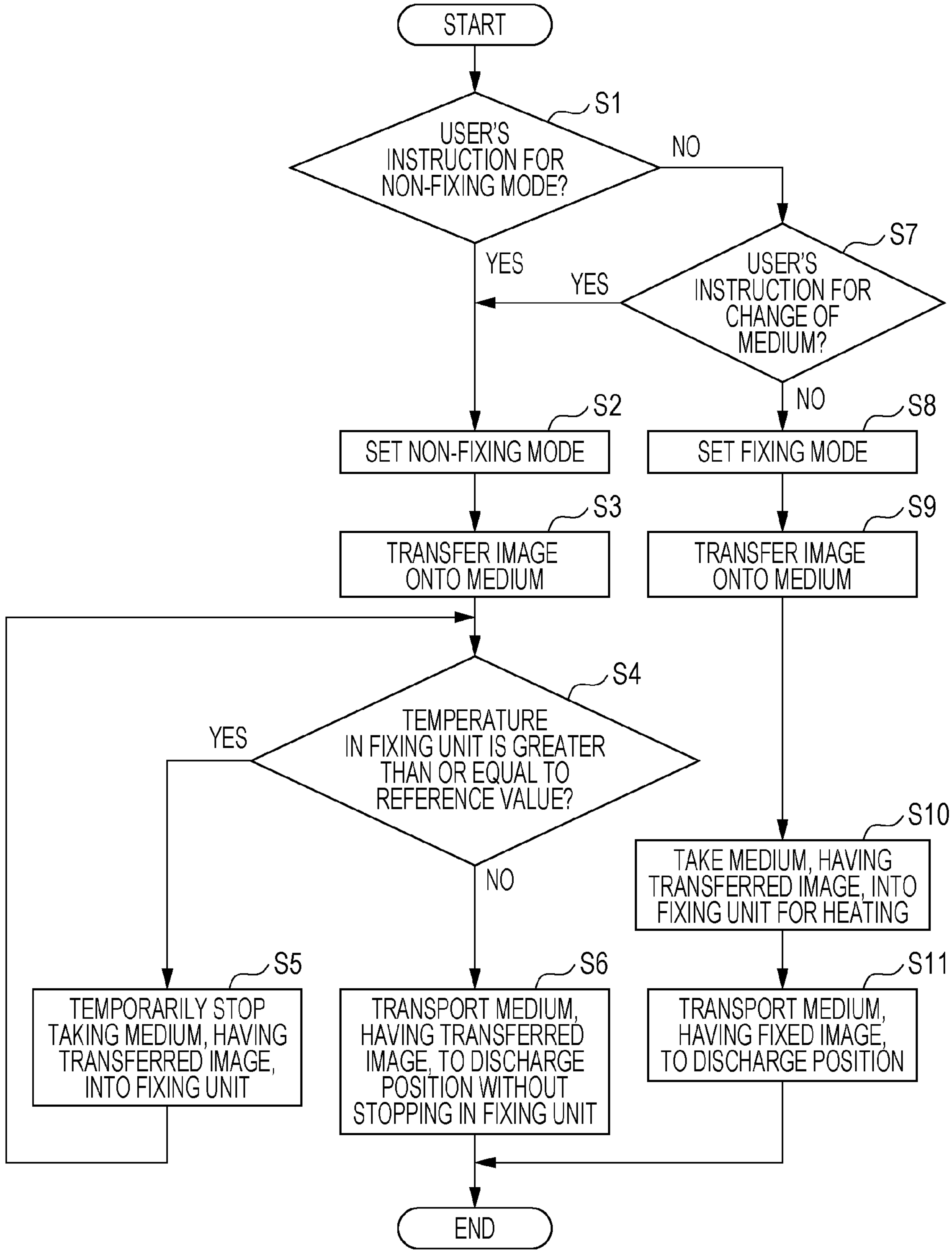
FIG. 8 is a flowchart of an exemplary control operation performed by a processor.

FIG. 8 is a flowchart of an exemplary control operation performed by the processor 410 (see FIG. 4). The symbol, S, illustrated in FIG. 8 means a step.

The processor 410, which has started running a program, determines whether a user has instructed that the non-fixing mode is to be used (step 1).

The "non-fixing mode" may be accepted as "printing without fixing an image" which is literally meant, or may be accepted as "test printing". Printing with fixing an image is handled as the "fixing mode" even if it is literally "test printing".

If a positive result is obtained in step 1, the processor 410 sets the operation mode to the non-fixing mode (step 2). If the non-fixing mode is set, the processor 410 maintains the open state of the opening 201 and the opening 202 of the fixing unit 200 even after start of the height calibration P1. In addition, the processor 410 pulls out the shutter 240 to stop heating the heating chamber by the heat source 210.

The processor 410 transfers an image onto a medium 500 (step 3).

After that, the processor 410 determines whether the temperature in the fixing unit 200 is greater than or equal to the reference value (step 4). The temperature is the ambient temperature in the heating chamber which is measured by the temperature sensor 250 (see FIG. 3).

If a positive result is obtained in step 4, the processor 410 temporarily stops taking the medium, onto which the image has been transferred, into the fixing unit 200 (step 5). After that, the processor 410 returns to the determination in step 4. While a positive result is obtained in step 4, the processor 410 repeatedly performs the processes in step 4 and step 5.

When the temperature in the fixing unit 200 is lower than the reference value, a negative result is obtained in step 4. When a negative result is obtained in step 4, the processor 410 transports the medium, onto which the image has been transferred, to the discharge position without stopping the medium in the fixing unit 200 (step 6). In this case, since the temperature in the fixing unit 200 is less than the reference value and the medium 500 passes through the fixing unit 200 without stopping in the fixing unit 200, the image, which has been transferred onto the surface of the medium 500, is not fixed.

If a negative result is obtained in step 1, the processor 410 determines whether a user instructs that the medium 500 is to be changed (step 7).

Even when the user specifies the fixing mode, if the user instructs that the thickness or shape of the medium 500 is to be changed, the height calibration and the like are highly likely to be necessary.

Therefore, in the first exemplary embodiment, if a positive result is obtained in step 7, the processor 410 sets the operation mode to the non-fixing mode (step 2). After that, steps 3 to 6 are performed.

In contrast, if a negative result is obtained in step 7, the processor 410 sets the operation mode to the fixing mode (step 8).

Then, the processor 410 transfers an image onto the medium 500 (step 9).

After that, the processor 410 takes the medium, onto which the image has been transferred, into the fixing unit 200 for heating (step 10). Since it is in the fixing mode, the temperature in the heating chamber is greater than or equal to the reference value. Therefore, the image is fixed onto the surface of the medium 500.

After that, the processor 410 transports the medium 500, on which the image has been fixed, to the discharge position (step 11).

Second Exemplary Embodiment

In a second exemplary embodiment, the case in which an infrared laser or an ultraviolet laser is used to fix an image will be described.

Figure 9:
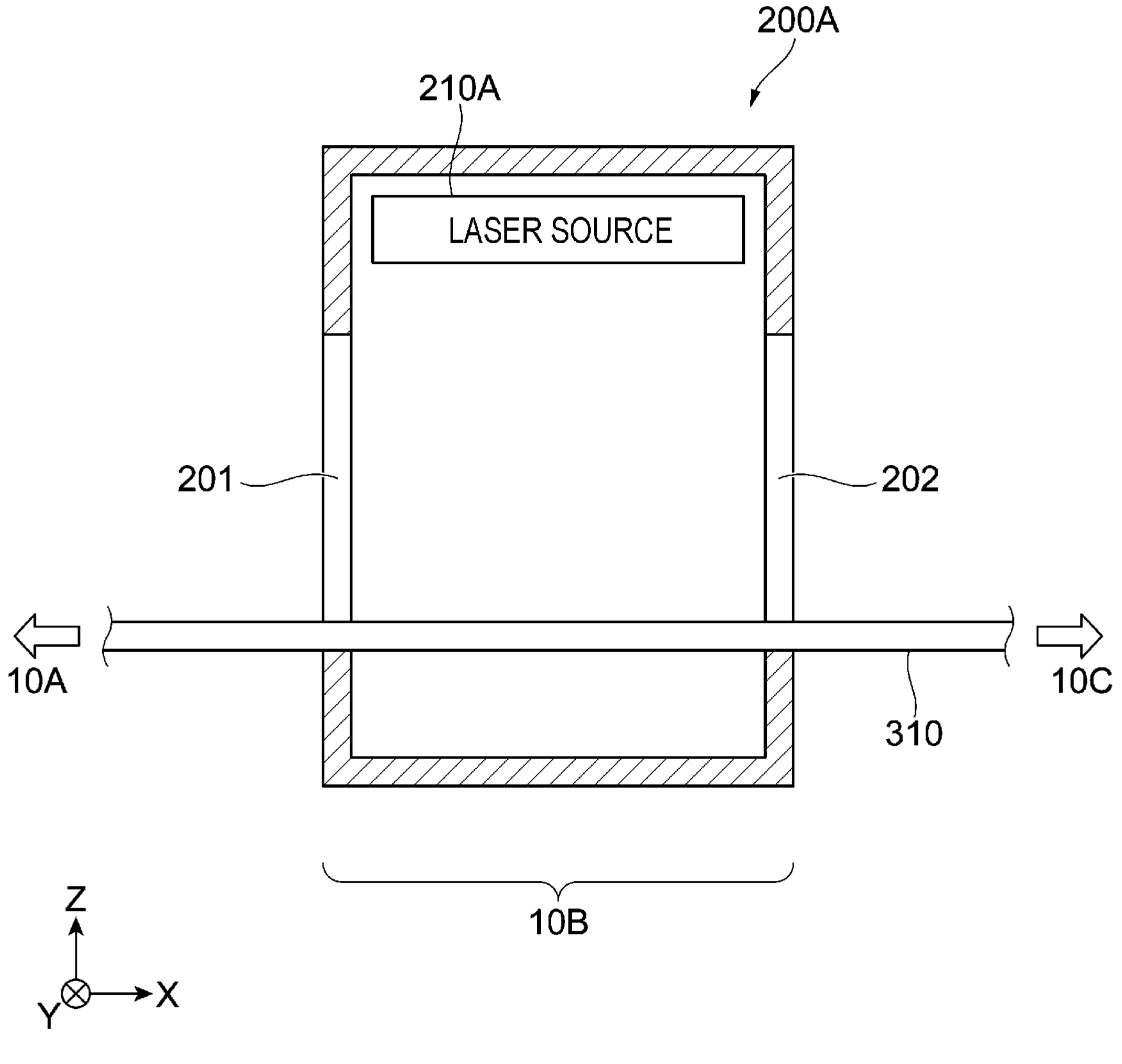
FIG. 9 is a diagram for describing a schematic configuration of a fixing unit used in an image forming apparatus assumed in a second exemplary embodiment.

FIG. 9 is a diagram for describing a schematic configuration of a fixing unit 200A used in the image forming apparatus 10 assumed in the second exemplary embodiment. In FIG. 9, parts corresponding to those in FIG. 3 are designated with the corresponding reference numerals.

The fixing unit 200A in FIG. 9 includes a laser source 210A which emits laser light for melting particles transferred onto a medium 500.

In the case of use of the laser source 210A, a local portion of the surface of a medium 500 is heated. Thus, the shutters 220, 230, and 240 are not provided. In addition, the temperature sensor 250 is also unnecessary.

In the second exemplary embodiment, the laser source 210A emits laser light in the fixing mode, and a local portion of the surface of the medium 500 taken into the fixing unit 200A is heated. Toner or the like melted through heating causes the image to be fixed on the surface of the medium 500.

In contrast, in the non-fixing mode, emission of laser light by the laser source 210A is stopped. Therefore, even when a medium 500, onto which an image has been transferred, passes through the fixing unit 200A, the image is not fixed on the medium 500.

Third Exemplary Embodiment

In a third exemplary embodiment, the case in which an image is fixed through contact with a medium 500 will be described.

Figure 10A:
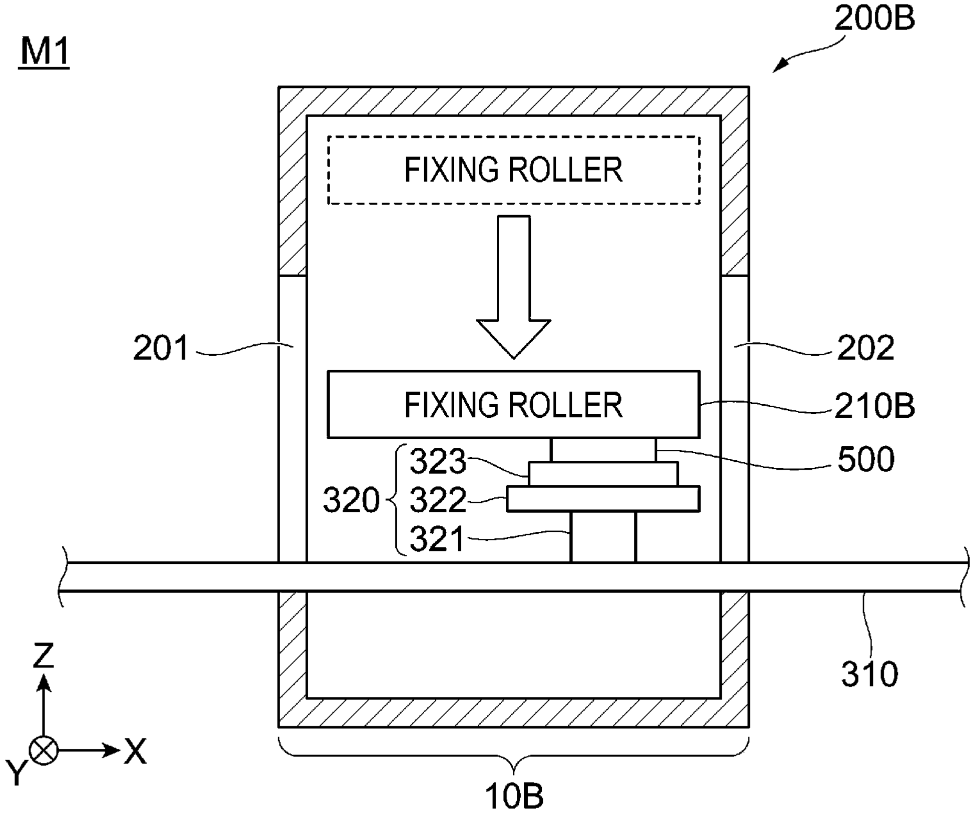
FIGS. 10A and 10B are diagrams for describing a schematic configuration of a fixing unit used in an image forming apparatus assumed in a third exemplary embodiment.
Figure 10B:
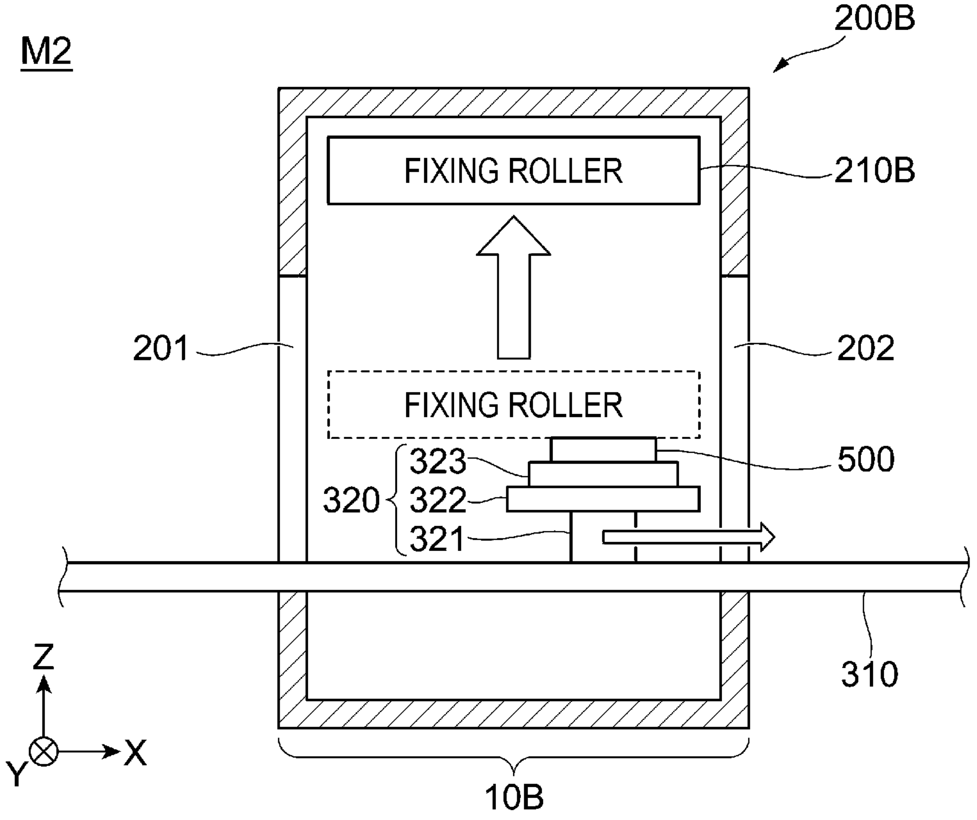

FIGS. 10A and 10B are diagrams for describing a schematic configuration of a fixing unit 200B used in the image forming apparatus 10 assumed in the third exemplary embodiment. In FIGS. 10A and 10B, parts corresponding to those in FIG. 9 are designated with the corresponding reference numerals.

The fixing unit 200B in FIGS. 10A and 10B includes a fixing roller 210B which applies a pressure or heat to toner or the like transferred onto a medium 500 for melting.

FIG. 10A is a diagram illustrating the mode M1 for describing the position of the fixing roller 210B in the fixing mode. In the fixing mode, the fixing roller 210B is lowered to the height at which the fixing roller 210B is in contact with the surface of a medium 500 which moves in the horizontal direction.

FIG. 10B is a diagram illustrating the mode M2 for describing the position of the fixing roller 210B in the non-fixing mode. In the non-fixing mode, the fixing roller 210B is raised to a height at which the fixing roller 210B is not in contact with the surface of a medium 500 which moves in the horizontal direction. That is, the fixing roller 210B is evacuated from the transport path.

Other Exemplary Embodiments (1) The exemplary embodiments of the present disclosure are described above. The technical scope of the present disclosure is not limited to the scope described in the exemplary embodiments. It is clear, from the description about the claims, that an embodiment obtained by adding various changes or improvements to the exemplary embodiments is also encompassed in the technical scope of the present disclosure.

(2) In the exemplary embodiments described above, it is assumed that a medium 500 is a plate-shaped object. Alternatively, a medium 500 may be a ball, a cylinder, a frustum of a cone, or an object having another three-dimensional shape as long as the medium 500 has a standardized thickness and shape.

(3) In the exemplary embodiments described above, the material of a medium 500 is, for example, metal, glass, or tile. Alternatively, the material of a medium 500 may be, for example, cloth, paper, or plastic.

(4) In the exemplary embodiments described above, an opening is provided for the top surface of the housing 10C, and a medium 500 is mounted on or dismounted from the mount 320 through the opening. Alternatively, the opening may be formed on a side surface of the housing 10C.

(5) In the exemplary embodiments described above, the shutter 240 is disposed between the heat source 210 of the fixing unit 200 and the space through which a medium 500 passes. Alternatively, a configuration in which the shutter 240 is not disposed may be employed. In the non-fixing mode, control may be exerted so that the heat source 210 is switched off.

(6) In the exemplary embodiments described above, in the non-fixing mode, control is exerted so that the openings 201 and 202 are open. Alternatively, a blower fan or an exhaust fan may be used to actively exhaust heat from the heating chamber.

(7) In the exemplary embodiments described above, the roll-up shutters 220, 230, and 240 are used. Alternatively, opening/closing doors or sliding doors may be used.

(8) In the exemplary embodiments described above, the roll-up shutters 220, 230, and 240 are used. Alternatively, curtains having the heat insulation property may be disposed.

(9) In the exemplary embodiments described above, the roll-up shutters 220, 230, and 240 are used. Alternatively, air outlets, through which air flows are produced along the openings 201 and 202, may be provided. That is, air curtains may be disposed in the openings 201 and 202. An air curtain may be provided between the heat source 210 and the heating chamber.

(10) In the exemplary embodiments described above, the temperature sensor 250 is disposed in the heating chamber. Alternatively, a configuration in which the temperature sensor 250 is not disposed may be employed. In this case, information about temperature measured by the temperature sensor 250 may not be used. Thus, the operation mode is controlled in accordance with user operations or the like.

(11) In the exemplary embodiments described above, the electrophotographic system is employed for image recording. Alternatively, an inkjet system which ejects ink droplets onto the surface of a medium 500 may be employed. In this case, an ink head is an exemplary transfer unit 100. When an ink head is used as the transfer unit 100, height calibration is performed to avoid a collision between a medium 500 and the ink head.

(12) In the exemplary embodiments described above, the transporter 300 which moves the mount 320 along the transport rail 310 is used. Alternatively, a conveyor belt may be used to transport a medium 500. In formation of images on media 500 having various thicknesses and shapes, a raising/lowering mechanism which enables a conveyor belt to be raised or lowered in the vertical direction may be used in combination with the conveyor belt.

(13) In the exemplary embodiments described above, the position at which a medium 500 is mounted on the mount 320 and the position at which a medium 500 is dismounted from the mount 320 are provided on the same side with respect to the transfer unit 100. Alternatively, the position at which a medium 500 is mounted on the mount 320 and the position at which a medium 500 is dismounted from the mount 320 may be located with the transfer unit 100 interposed in between. In this case, an image is transferred and fixed while the mount 320 moves in one direction.

(14) In the exemplary embodiments described above, the transfer unit 100 and the fixing unit 200 are disposed side by side in the horizontal direction. Alternatively, the transfer unit 100 and the fixing unit 200 may be disposed side by side in the vertical direction.

(15) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

What is claimed is:

1. An image forming system comprising:
a transporter that transports an object;
a transfer unit that transfers an image onto the object transported by the transporter;
a fixing unit that fixes, onto the object, the image transferred by the transfer unit; and
a processor configured to:
in a first mode, exert control to transfer the image onto the object and fix the image is fixed onto the object;
when an instruction indicating that a property of the object is changed is received, make a transition to a second mode; and
in the second mode, exert control to transfer the image onto the object but not fix the image onto the object.

2. The image forming system according to claim 1, wherein the processor is configured to:
in the second mode, until a temperature in the fixing unit is lower than a reference value, stop moving, to the fixing unit, the object onto which the image has been transferred.

3. The image forming system according to claim 1, wherein the fixing unit comprises a light source, and wherein the processor is configured to:
in the first mode, cause the fixing unit to perform emission of light for fixing the image onto the object; and
in the second mode, cause the fixing unit to stop emission of light for fixing the image onto the object.

4. The image forming system according to claim 1, wherein the processor is configured to:
in the first mode, move the fixing unit towards a transport path for the object; and
in the second mode, move the fixing unit away from the transport path for the object.

5. The image forming system according to claim 1, wherein
the instruction is received through an operation unit.

6. An image forming system comprising:
transport means for transporting an object;
transfer means for transferring an image onto the object transported by the transport means;
fixing means for fixing, onto the object, the image transferred by the transfer means; and
control means for, in a first mode, exerting control to transfer the image onto the object and fix the image onto the object, for making a transition to a second mode when an instruction indicating that a property of the object is changed is received, and for, in the second mode, exerting control to transfer the image onto the object but not fix the image onto the object.

7. The image forming system according to claim 1, wherein a temperature of the fixing unit in the second mode is lower than that in the first mode.

8. The image forming system according to claim 1, wherein a time of the object passing through the fixing unit in the second mode is shorter than that in the first mode.

* * * * *